US005078048A

United States Patent [19]

Yoshino et al.

[11] Patent Number: 5,078,048

[45] Date of Patent: Jan. 7, 1992

[54] COOKING APPARATUS INCLUDING A PYROELECTRIC VAPOR SENSOR

[75] Inventors: Koji Yoshino, Kyoto; Takashi Kashimoto, Nara, both of Japan

[73] Assignee: Matsushita Electric Industrial Co., Ltd., Osaka, Japan

[21] Appl. No.: 655,230

[22] Filed: Feb. 12, 1991

Related U.S. Application Data

[63] Continuation of Ser. No. 387,544, Jul. 28, 1989, abandoned.

[30] Foreign Application Priority Data

Aug. 3, 1988 [JP] Japan ................................ 63-194063

[51] Int. Cl.$^5$ ........................ A47J 27/62; H05B 6/64

[52] U.S. Cl. ........................................ 99/331; 99/451; 99/DIG. 14; 219/10.55 B; 219/10.55 E

[58] Field of Search ..................... 99/325, 329 R, 331, 99/333, 451, DIG. 14; 219/10.55 B, 10.55 E, 10.55 R

[56] References Cited

U.S. PATENT DOCUMENTS

| | | | |
|---|---|---|---|
| 4,191,876 | 3/1980 | Ohkubo et al. | 219/10.55 B |
| 4,582,971 | 4/1986 | Ueda | 99/325 X |
| 4,587,393 | 5/1986 | Ueda | 99/325 X |
| 4,727,799 | 3/1988 | Ohshima et al. | 99/331 |
| 4,874,928 | 10/1989 | Kasai | 99/325 X |

FOREIGN PATENT DOCUMENTS

| | | | |
|---|---|---|---|
| 76/14077 | 10/1977 | Australia . | |
| 77/22280 | 3/1979 | Australia . | |
| 80/60168 | 11/1981 | Australia . | |
| 80/65464 | 12/1982 | Australia . | |
| 83/11536 | 1/1986 | Australia . | |
| 85/037296 | 9/1986 | Australia . | |
| 86/53460 | 3/1988 | Australia . | |
| 0000957 | 3/1979 | European Pat. Off. . | |
| 0198430 | 10/1986 | European Pat. Off. . | |
| 0268329 | 5/1988 | European Pat. Off. . | |
| 53-34152 | 3/1978 | Japan | 219/10.55 B |
| 53-77365 | 7/1978 | Japan . | |
| 54-2547 | 1/1979 | Japan | 219/10.55 B |
| 62-37624 | 2/1987 | Japan . | |
| 83/00374 | 2/1983 | PCT Int'l Appl. . | |
| 83/00375 | 2/1983 | PCT Int'l Appl. . | |
| 83/01675 | 5/1983 | PCT Int'l Appl. . | |

*Primary Examiner*—Philip R. Coe
*Assistant Examiner*—Stephen F. Gerrity
*Attorney, Agent, or Firm*—Panitch Schwarze Jacobs & Nadel

[57] ABSTRACT

A cooking apparatus such as a high-frequency heating-cooking apparatus having a pyroelectric vapor sensor for detecting the cooking condition of food comprises an air duct for delivering vapor to the pyroelectric vapor sensor and a cooling construction for providing cool air to mix with the vapor as well as cool air to cool the pyroelectric vapor sensor.

3 Claims, 12 Drawing Sheets

COOKING APPARATUS INCLUDING A PYROELECTRIC VAPOR SENSOR

This is a continuation application of U.S. patent application Ser. No. 387,544, filed July 28, 1989, now abandoned.

BACKGROUND OF THE INVENTION

1. Field of the Invention

The present invention relates to a cooking apparatus which uses a pyroelectric vapor sensor for performing control by detecting the state of vapor generated from food as the food is heated.

2. Description of the Prior Art

Sensing means used in conventional heating-cooking apparatuses are described below with reference to the drawings.

FIG. 1 shows a conventional high-frequency heating apparatus using a humidity sensor. As food is heated and the moisture contained therein boils off, the change of the humidity level in the heating apparatus suddenly changes from decrease to increase. With a humidity sensor, it is possible to determine the completion of cooking by detecting this point of change. Hence, in FIG. 1, the heating apparatus is controlled by detecting the resistance change in a humidity sensor 1 at which, along with a resistor 3, the voltage from a reference voltage supply 2 is divided. (An example such as disclosed in Japanese Laid-Open Patent Publication No. 53-77365)

There is also available a means, as shown in FIGS. 2 and 3, which uses a pyroelectric vapor sensor instead of a humidity sensor. With such a means, an apparatus is controlled by detecting the polarization current produced as a result of the thermal change when heat is transferred between a pyroelectric vapor sensor 4 and vapor 6 generated from food 5. (An example such as disclosed in Japanese Laid-Open Patent Publication No. 62-37624).

However, using a humidity sensor such as described above has had the problem that since the detection sensitivity of the humidity sensor drops because of adherence of gas and oil from food during the cooking of the food, the deposits on the humidity sensor have to be vaporized for each cooking using a refresh heat-treat heater or the like, thus requiring extra electricity and additional costs.

On the other hand, in the case of using a pyroelectric vapor sensor instead of the humidity sensor, if the construction is such that the pyroelectric vapor sensor is installed in an exhaust flue or in a vapor vent, the pyroelectric vapor sensor is heated to a considerably high temperature because it is directly subjected to hot vapor and also because the temperature of the surrounding oven, cabinet, etc., rises. Since the pyroelectric vapor sensor provides an output according to the temperature difference $\Delta T$ between the hot vapor and the sensing element, the above construction has had the problem that when the temperature of the pyroelectric vapor sensor rises, the $\Delta T$ becomes smaller, causing a drop in the sensor output. In other words, when an apparatus is controlled according to the output from the pyroelectric vapor sensor, the sensor output drops as cooking is repeated and as the temperature of the pyroelectric vapor sensor rises, and therefore, a longer detection time is needed even when cooking food of the same kind, causing a variation in the cooking results unless corrected by using a device for temperature compensation or by including software for adjustment. This has been the problem with the above construction yet to be solved.

SUMMARY OF THE INVENTION

The cooking apparatus of this invention, which overcomes the above-discussed and numerous other disadvantages and deficiencies of the prior art, comprises a heating compartment in which food to be cooked is accommodated, a heat source for heating the food, and a pyroelectric vapor sensor for detecting the cooking condition of the food, the heating compartment having a vapor vent from which vapor is discharged and distributed to the pyroelectric vapor sensor through an air duct made from a pipe or the like.

In a preferred embodiment, the cooking apparatus further comprises a cooling fan for cooling said pyroelectric vapor sensor.

In a preferred embodiment, an electromagnetic wave generator is used as said heat source and said cooling fan cools both said pyroelectric vapor sensor and said electromagnetic wave generator.

In a preferred embodiment, the pyroelectric vapor sensor comprising a pyroelectric element and a metal plate on which said pyroelectric element is disposed, and said cooling fan cools said metal side of said pyroelectric vapor sensor.

In a preferred embodiment, the fan cools said element side of said pyroelectric vapor sensor.

In a preferred embodiment, the pyroelectric vapor sensor is mounted at a position away from an open end of said air duct.

Thus, the invention described herein makes possible the objective of providing a cooking apparatus that attains uniform cooking results by minimizing the temperature rise of the pyroelectric vapor sensor and by detecting the heating condition of food under a stable temperature condition.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The following describes the preferred embodiments of the present invention with reference to the accompanying drawings.

Figure 1:
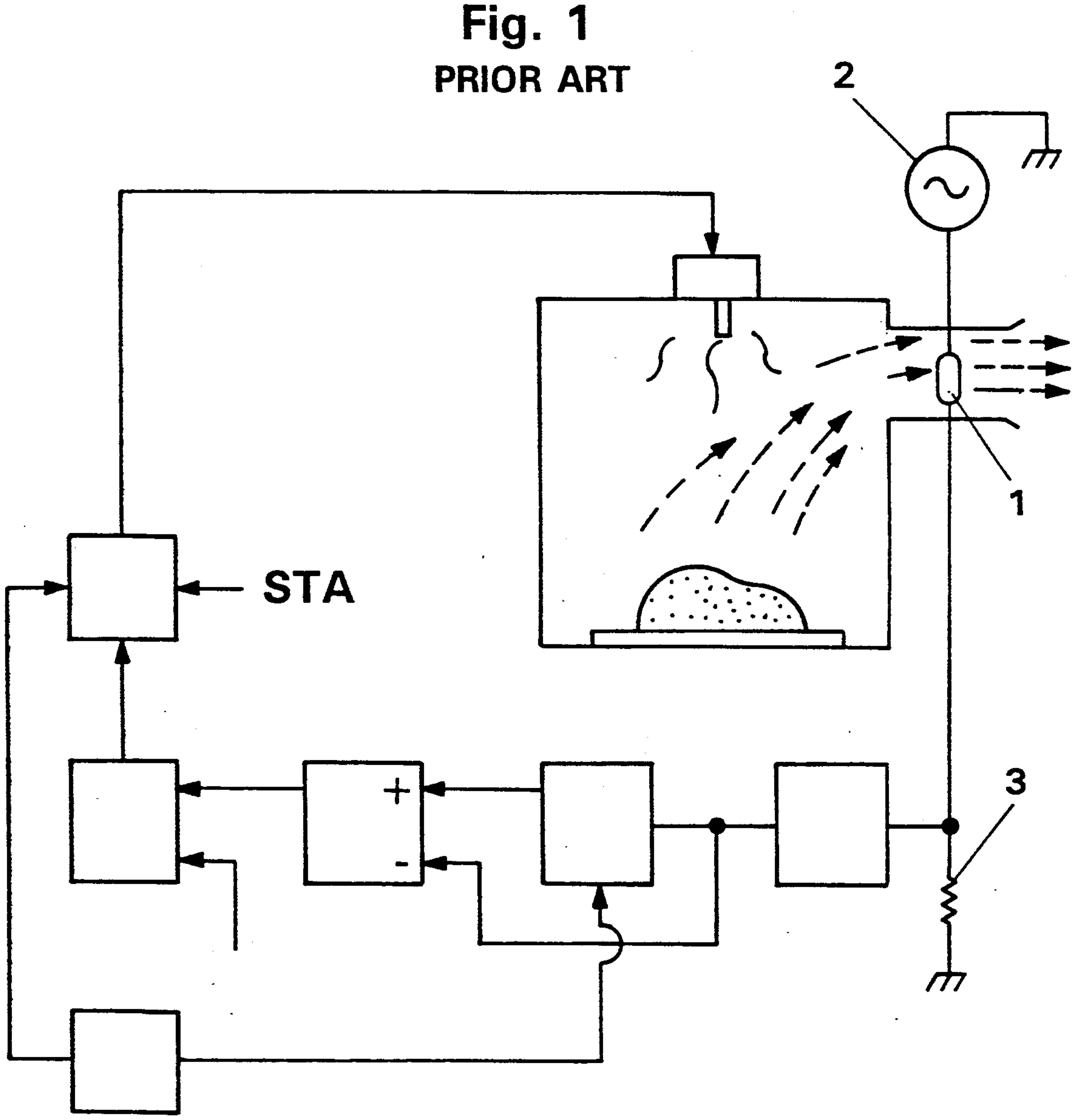
Fig. 1 PRIOR ART
FIG. 1 is a schematic diagram showing a conventional high-frequency heating apparatus with a humidity sensor.
Figure 2:
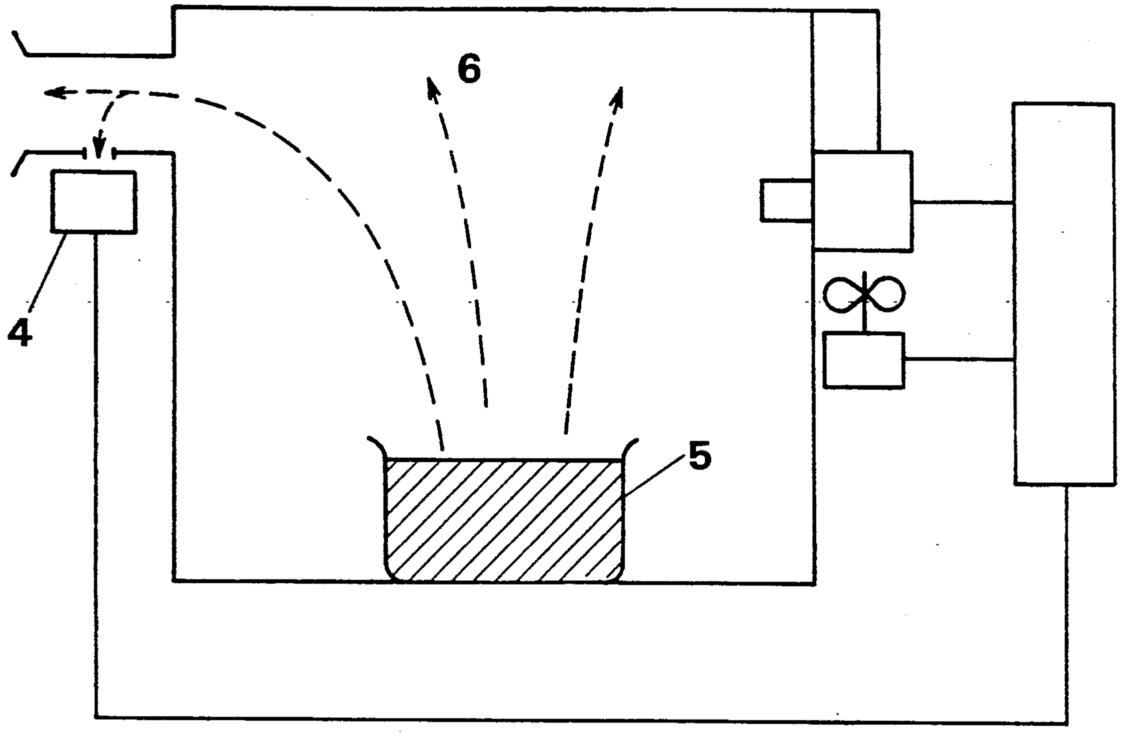
Fig. 2 PRIOR ART
FIGS. 2 and 3, respectively, are schematic diagrams showing examples of the construction of a conventional pyroelectric vapor sensor in conventional high-frequency heating apparatuses.
Figure 3:
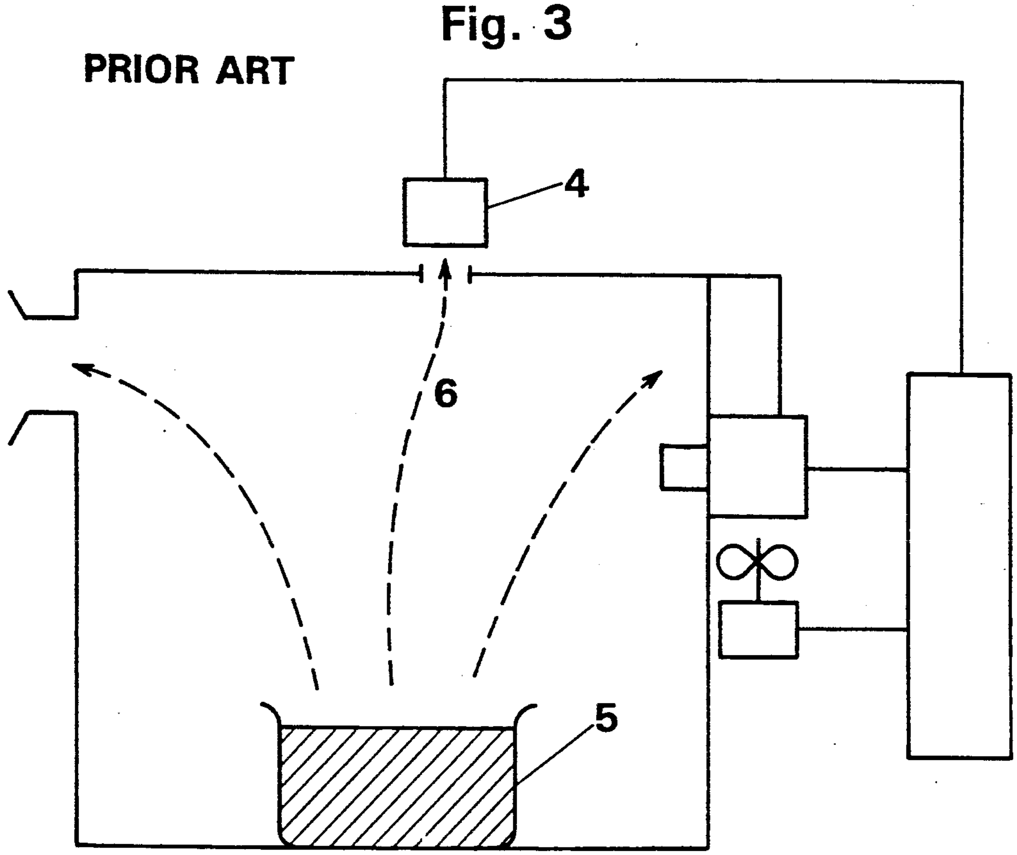
Fig. 3 PRIOR ART
Figure 4:
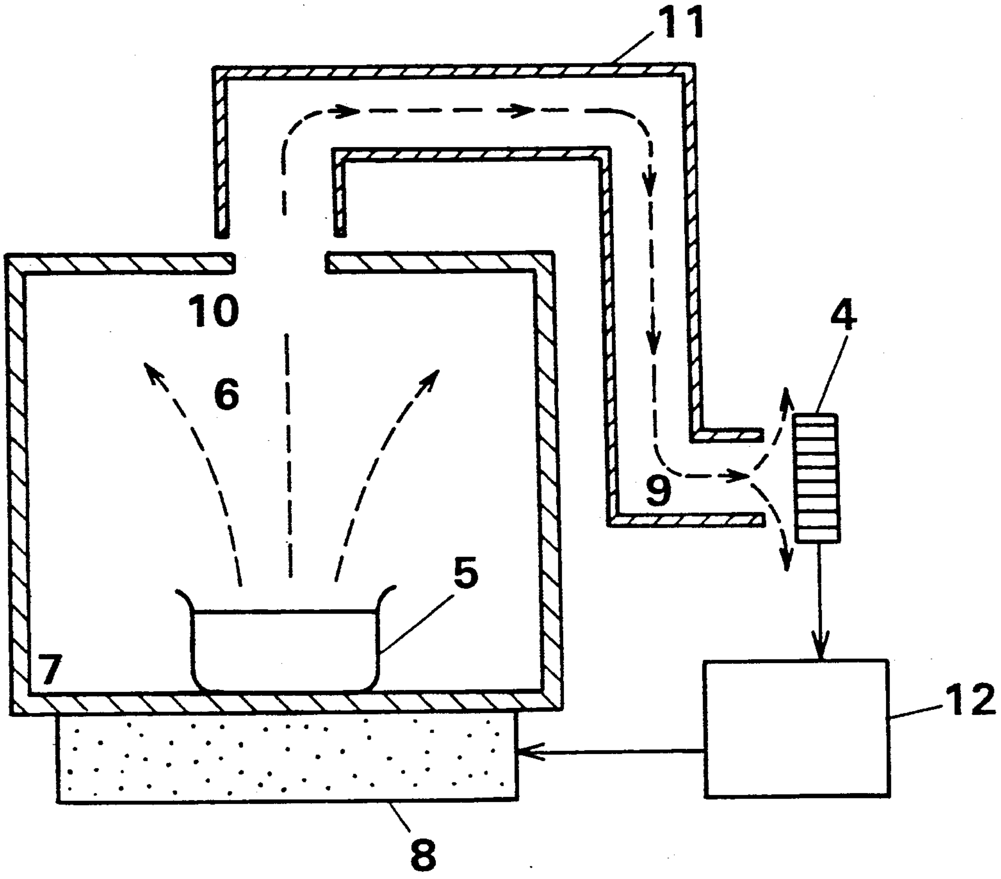
FIG. 4 is a schematic diagram showing a high-frequency heating-cooking apparatus with a pyroelectric vapor sensor of this invention.

FIG. 4 is a cross sectional front view of a cooking apparatus with a pyroelectric sensor of the present invention of claim 1.

Placed in a heating compartment 7 is food 5 which is heated by a heat source 8. As cooking progresses, a small fraction 9 of water vapor 6 generated from the food 5 is led through a vapor vent 10 and a vapor (air) duct 11 to a pyroelectric vapor sensor 4. When a temperature difference $\Delta T$ is given to the pyroelectric vapor sensor 4 by the small fraction 9, the pyroelectric vapor sensor 4 produces an output according to the $\Delta T$, the output being fed to a control unit 12 which determines the completion of cooking to cut off power to the heat source 8. Since the provision of the air duct 11 allows a wider selection of installation positions for the pyroelectric vapor sensor 4, it is possible to install the pyroelectric vapor sensor 4 by choosing a low temperature position.

Figure 5:
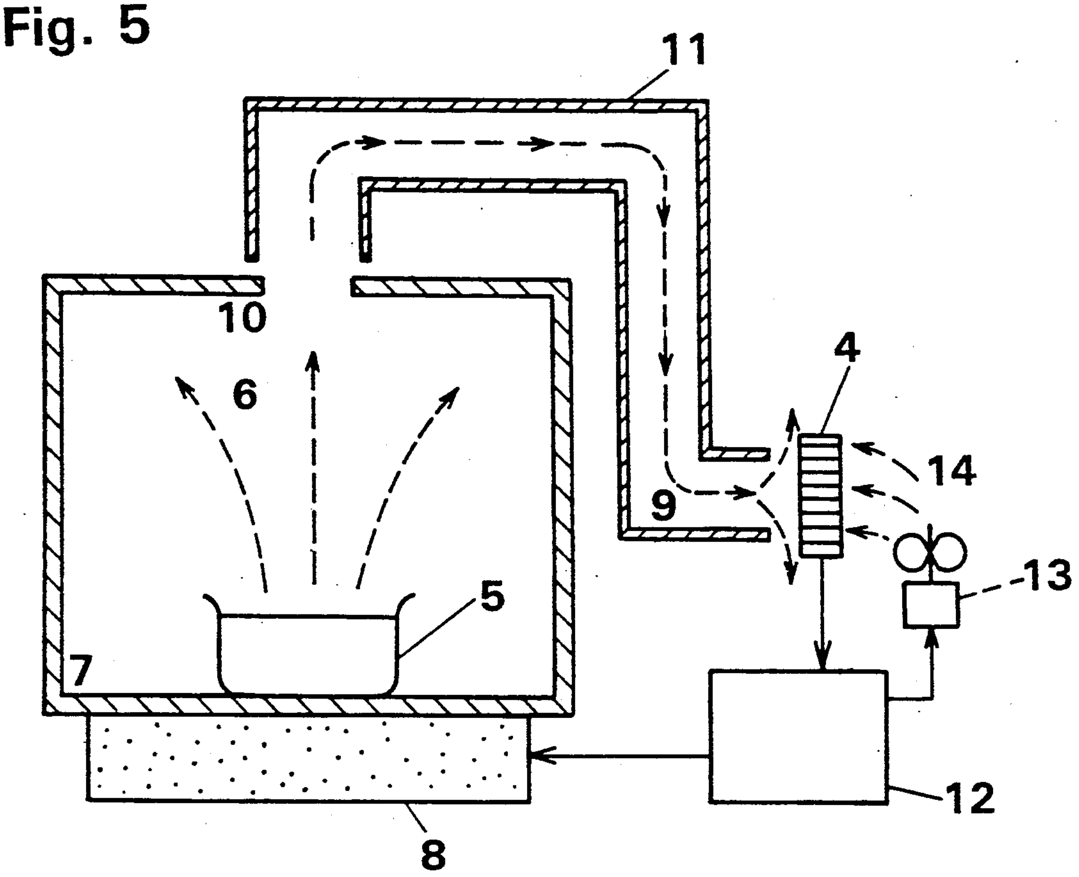
FIG. 5 is a schematic diagram showing another cooking apparatus with a pyroelectric vapor sensor of this invention.

FIG. 5 is a cross sectional front view of a cooking apparatus with a pyroelectric sensor of the present invention of claim 2. This example has the same construction as that of the foregoing example shown in FIG. 4, except that a cooling fan 13 is added, the pyroelectric vapor sensor 4 being cooled by cooling air 14 from the cooling fan 13. Thus, the construction of this example helps to minimize the temperature rise of the pyroelectric vapor sensor 4.

Figure 6A:
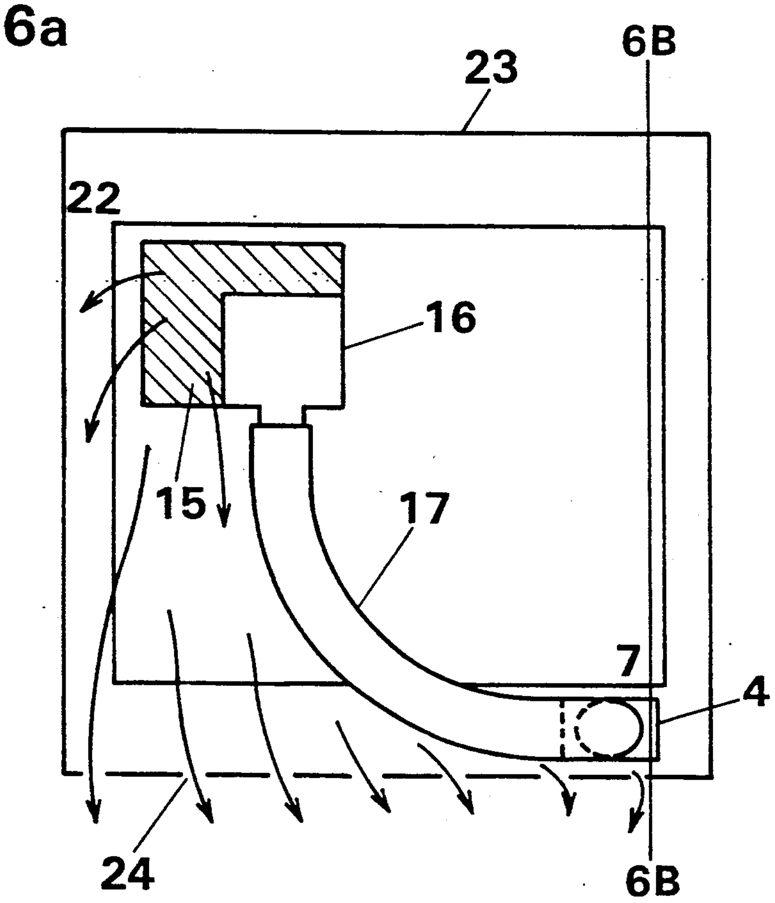
FIG. 6*a* is a side view showing the portion in the vicinity of the discharge port of another high-frequency heating-cooking apparatus with a pyroelectric vapor sensor of this invention.
Figure 6B:
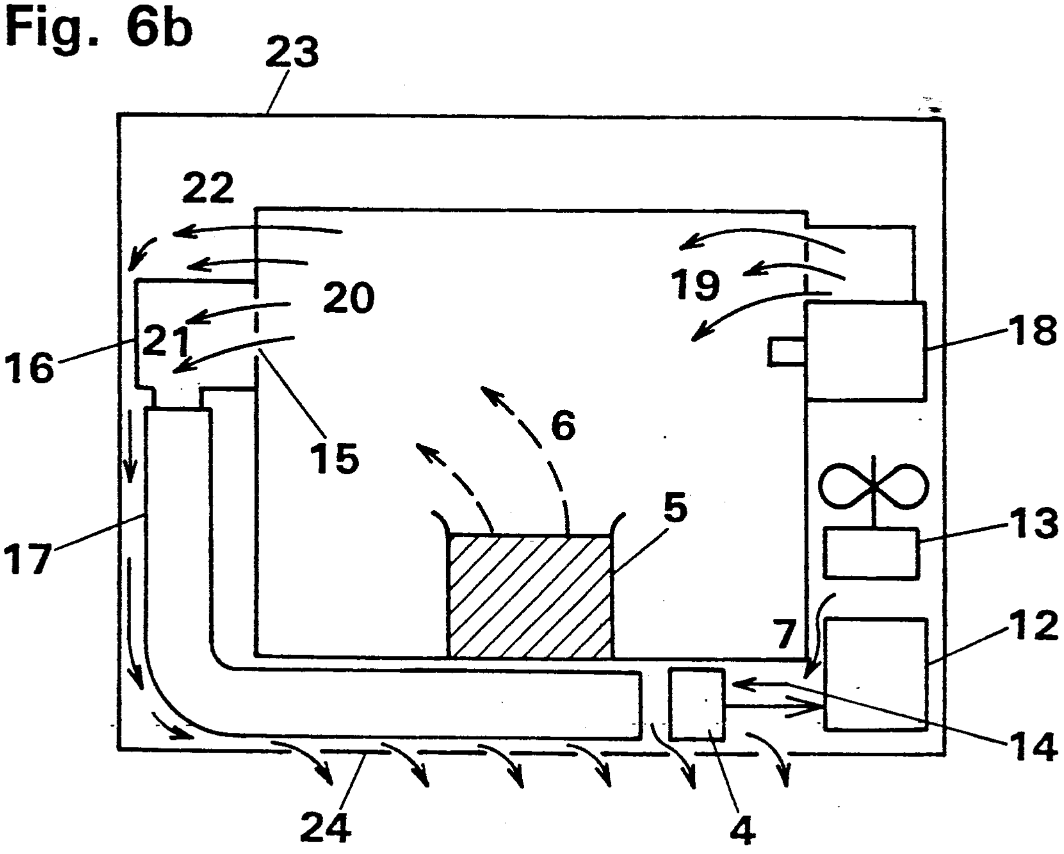
FIG. 6*b* is a front view taken along line A—A' in FIG. 6*a*.

FIGS. 6*a* and 6*b* show the construction of a high-frequency heating-cooking apparatus with a pyroelectric vapor sensor of the present invention of claim 3, FIG. 6*a* being a side view showing the vicinity of an exhaust vent 15, and FIG. 6*b* a section taken along A—A' in FIG. 6*a* viewed from the front.

In the high-frequency heating-cooking apparatus of this example, the pyroelectric vapor sensor 4 is installed in a low temperature place ventilated with cold air (in this example, under the heating compartment 7). A small fraction 21 of hot vapor strikes against a guide 16 and is directed through a pipe 17 to the pyroelectric vapor sensor 4. The output from the pyroelectric vapor sensor 4 is supplied to the control unit 12 which sends out signals to turn the power on and off to an electromagnetic wave generator 18 such as a magnetron that acts as a heat source and the cooling fan 13.

Food 5 is placed in the heating compartment 7, and cooling air 19 for the electromagnetic wave generator 18 is produced by the cooling fan 13 and directed into the heating compartment 7. The cooling air 19 for the electromagnetic wave generator 18 mixes with water vapor 6 generated from the food 5 to form a mixed vapor 23 which is led through the exhaust vent 15, a small fraction 21 thereof being directed to the guide 16 and a large fraction 22 thereof being discharged to the outside of the construction through a louver 24 formed in a cabinet 23. In this example, part of the exhaust vent 15 is used as a vapor vent to deliver the vapor to the pyroelectric vapor sensor 4. The cooling fan 13 also generates cooling air 14 for the pyroelectric vapor sensor 4, which means that only one cooling fan is used for simultaneous cooling of the electromagnetic wave generator 18 and the pyroelectric vapor sensor 4, thus eliminating the need for a cooling fan exclusively for the pyroelectric vapor sensor 4.

Figure 7A:
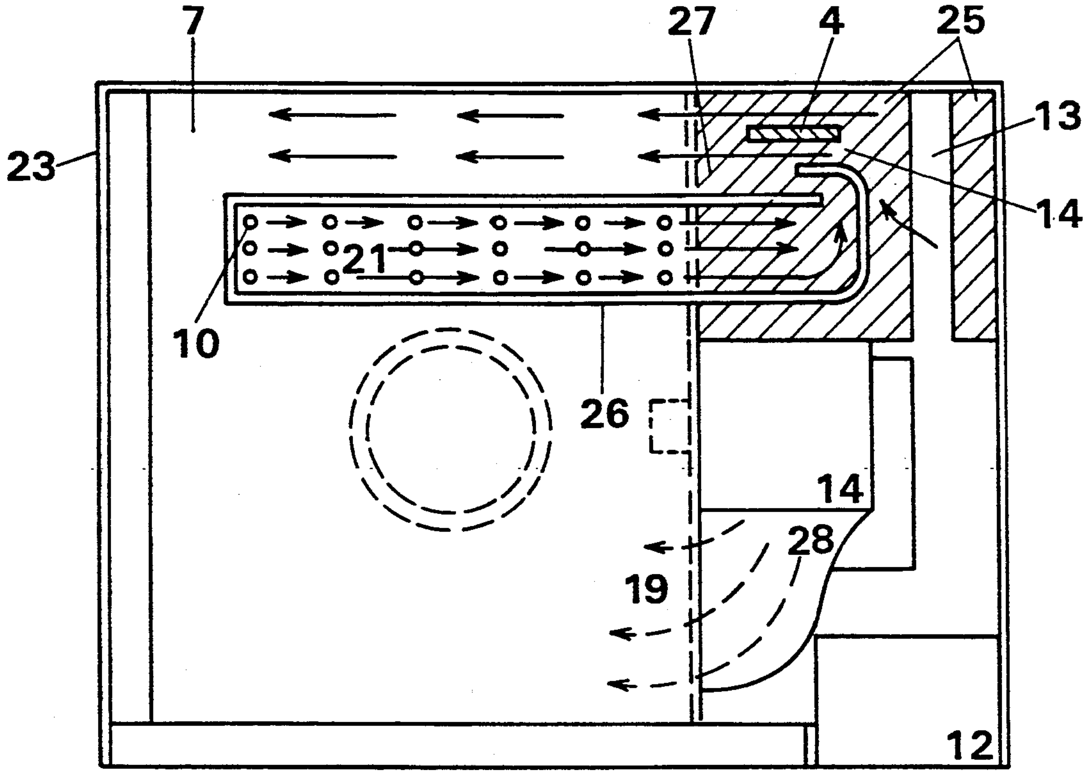
FIG. 7*a* is a plan view showing another high-frequency heating-cooking apparatus with a pyroelectric vapor sensor of this invention.
Figure 7B:
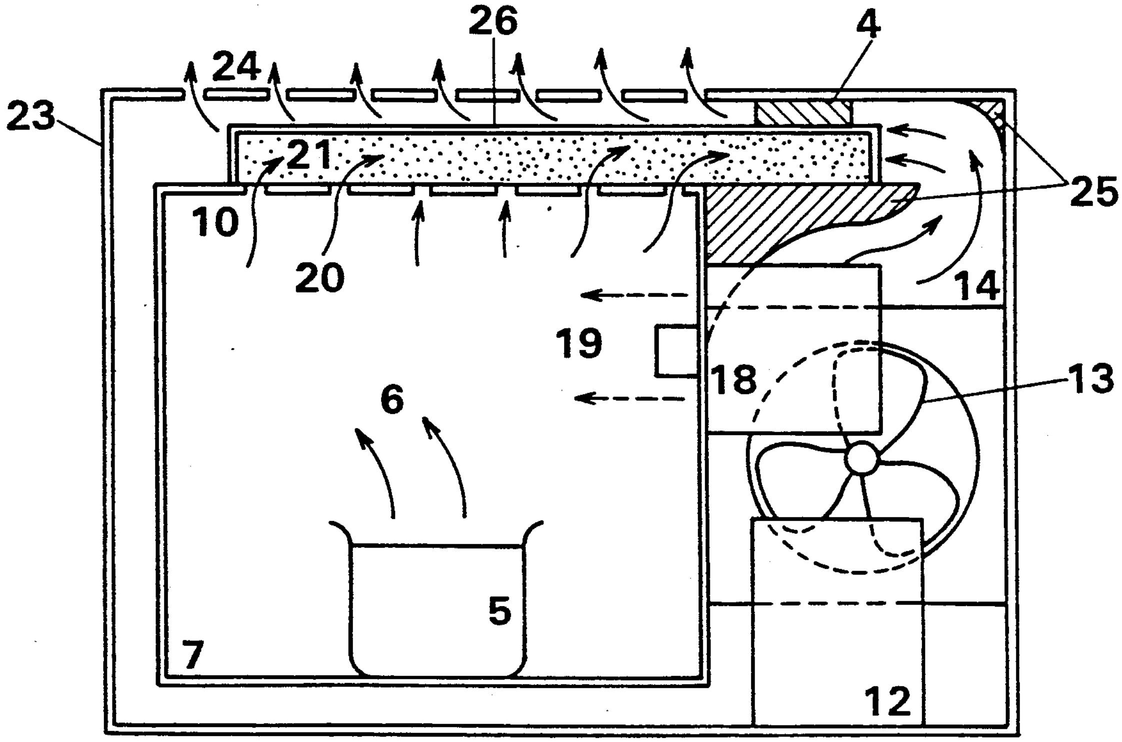
FIG. 7*b* is a front sectional view showing the cooking apparatus of FIG. 7*a*.

FIGS. 7*a* and 7*b* show the construction of another high-frequency heating-cooking apparatus with a pyroelectric vapor sensor of the present invention of claim 3, FIG. 7*a* being a top view and FIG. 7*b* a front sectional view.

For cooling the pyroelectric vapor sensor 4, the cooling air 14 from the cooling fan 13 is directed to the pyroelectric vapor sensor 4 by means of a guide 25. After cooling the pyroelectric vapor sensor 4, the cooling air 14 flows through a passage above the heating compartment 7 and is discharged to the outside through the louver 24 formed in the top of the cabinet 23.

On the other hand, the small fraction 21 of the mixed vapor is led to a guide 26 through the vapor vent 10 formed in the ceiling of the heating compartment 7, being drawn by the pressure of the cooling air 14, and is mixed with the cooling air 14 for distribution to the pyroelectric vapor sensor 4. The drawn-out vapor 27 is also discharged to the exterior through the louver 24 formed in the top of the cabinet 23.

The output from the pyroelectric vapor sensor 4 is supplied to the control unit 12 which sends out signals to turn the power on and off to the electromagnetic wave generator 18 and the cooling fan 13.

Food 5 is placed in the heating compartment 7, the cooling air 19 for the electromagnetic wave generator 18 produced by the cooling fan 13 being directed into the heating compartment 7 by means of a guide 28. The cooling air 19 for the electromagnetic wave generator 18 mixes with air 6 containing water vapor, oil, etc., generated from the food 5 to form a mixed vapor 20 which is delivered through the vapor vent 10 to the pyroelectric vapor sensor 4, as previously described.

Thus, the above construction facilitates the distribution of cooling air to the pyroelectric vapor sensor 4 to keep the sensor temperature low.

Figure 8:
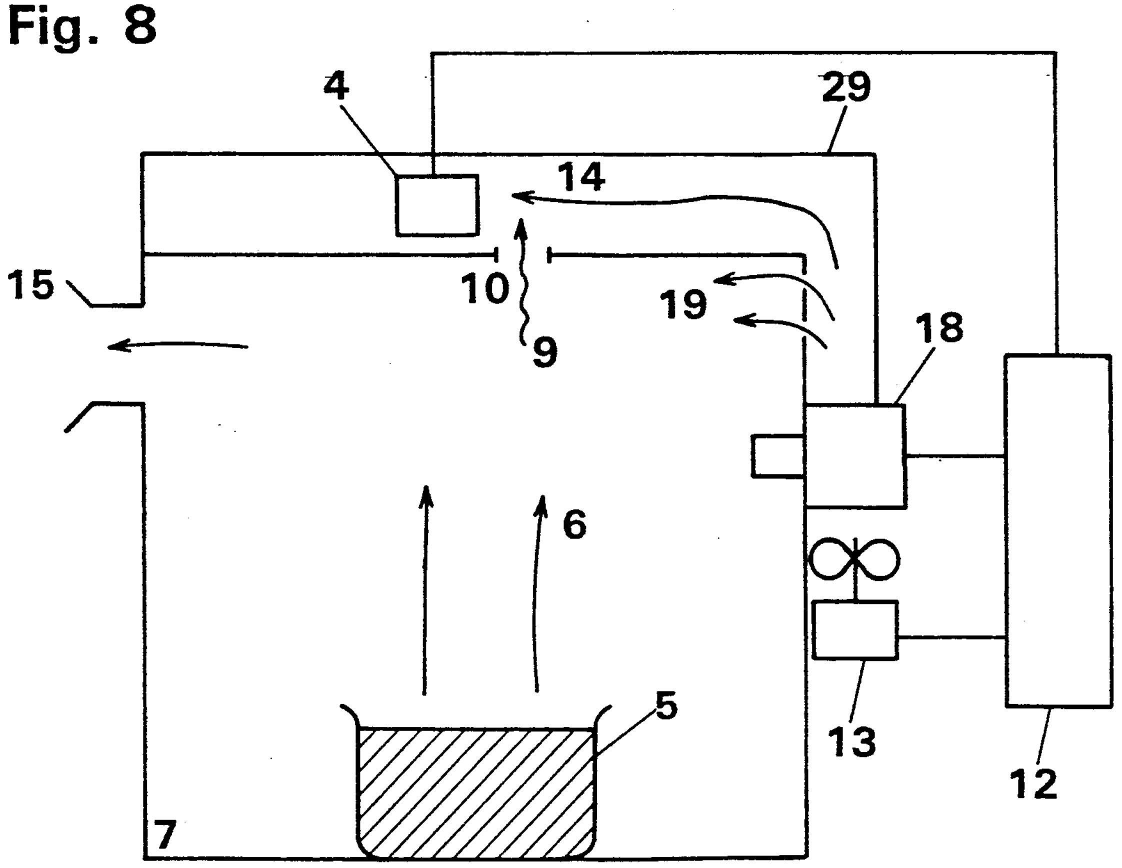
FIG. 8 is a schematic diagram showing another high-frequency heating-cooking apparatus with a pyroelectric vapor sensor of this invention.

FIG. 8 shows another high-frequency heating-cooking apparatus with a pyroelectric vapor sensor of the present invention of claim 3. The pyroelectric vapor sensor 4 is installed leeward of the vapor vent 10 in the ceiling of the heating compartment 7, the small fraction 9 of hot vapor and the cooling air 14 being received in a duct 29 which also serves as a vapor duct. The output from the pyroelectric vapor sensor 4 is supplied to the control unit 12 which sends out signals to turn the power on and off to the electromagnetic wave generator 18 and the cooling fan 13.

Food 5 is placed in the heating compartment 7, the cooling air 19 for the electromagnetic wave generator 18 produced by the cooling fan 13 being directed into the heating compartment 7. The remaining cooling air 14 is delivered to the pyroelectric vapor sensor 4 through the duct 29 which also serves as a vapor duct, as described above. The cooling air 19 and the air 6 containing water vapor, oil, etc., generated from the food 5 are discharged from the heating compartment 7 to the outside through the exhaust vent 15. The small fraction 9 of the hot vapor is conveyed through the vapor vent 10, is mixed with the cooling air 14, and is delivered to the sensor 4, as previously described.

Figure 9A:
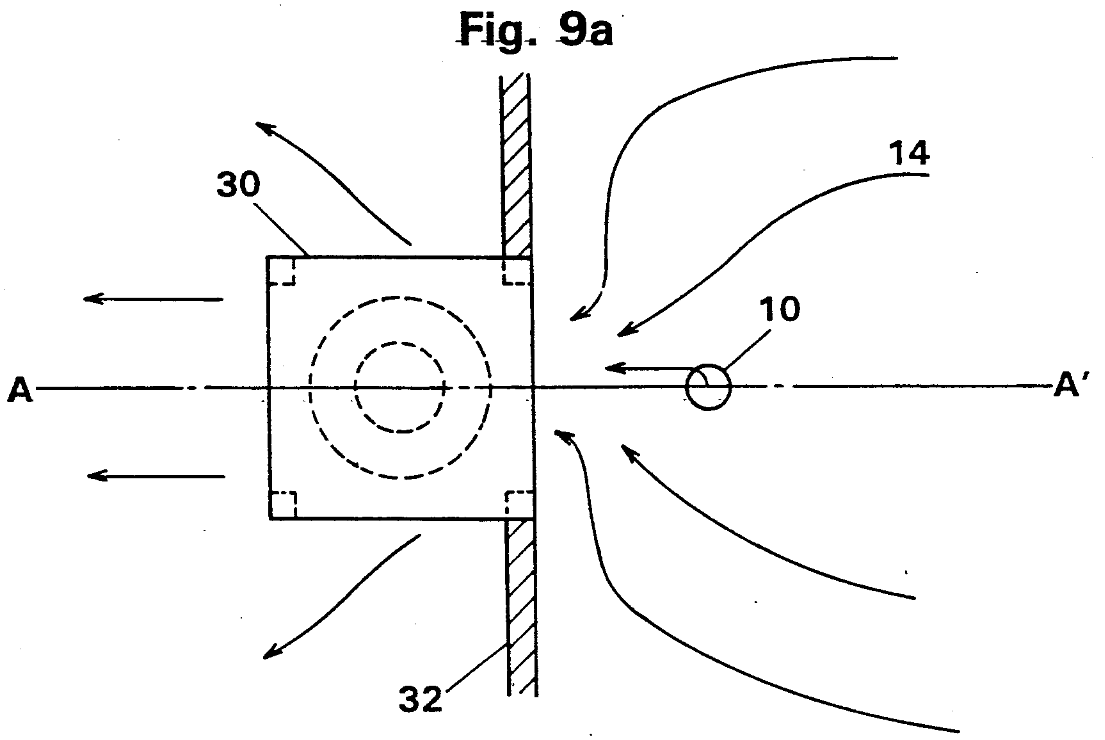
FIG. 9*a* is a schematic diagram showing an installation of the cooking apparatus of FIG. 8.
Figure 9B:
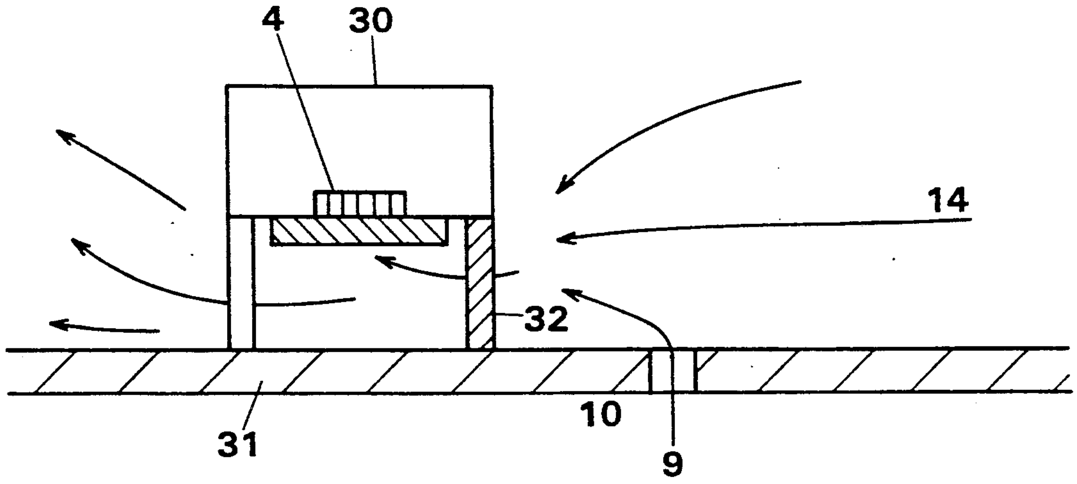
FIG. 9*b* is a schematic diagram taken along line A—A' in FIG. 9*a*.

FIGS. 9*a* and 9*b* show a specific installation example of the pyroelectric vapor sensor in the example shown in FIG. 8 that is a cooking apparatus of the present invention of claim 3, FIG. 9*a* being a top plan view and FIG. 9*b* a section taken along A—A' in FIG. 9*a*.

The pyroelectric vapor sensor 4 is installed, in an insulating way, leeward of the vapor vent 10 in the ceiling 31 of the heating compartment 7 by using a mounting bracket 30. The hot vapor 9 and the cooling air 14 are blocked and mixed by a blocking plate 32 which combines with the duct 29 of FIG. 8 to form a vapor duct, the mixture striking the pyroelectric vapor sensor 4 for generation of signals. The pyroelectric vapor sensor 4 is kept at a low temperature because of the continuously flowing cooling air 14.

Figure 10A:
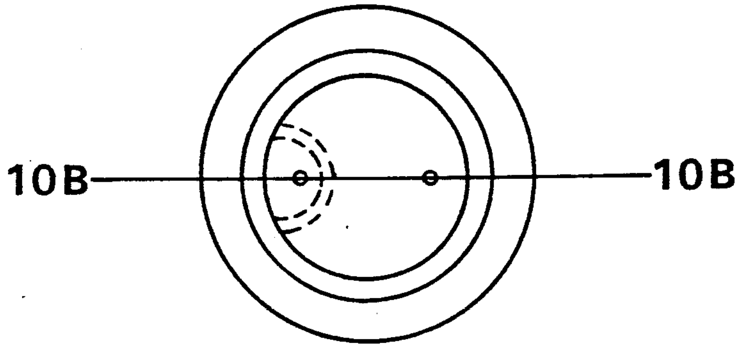
FIG. 10*a* is a plan view showing a pyroelectric vapor sensor used in this invention.
Figure 10B:
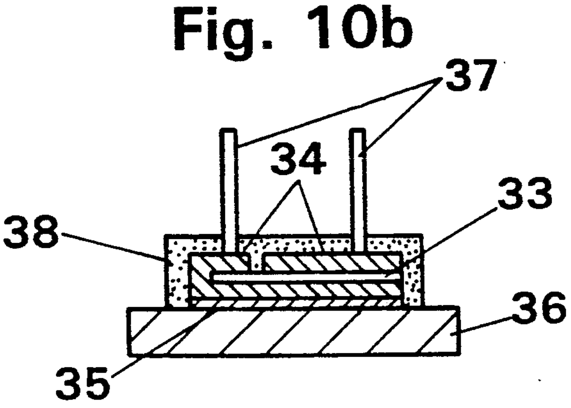
FIG. 10*b* is a sectional view taken along line A—A' in FIG. 10*a*.

FIGS. 10*a* and 10*b* show an example of the construction of a pyroelectric vapor sensor, FIG. 10*a* being a top view and FIG. 10*b* a section taken along A—A' in FIG. 10*a*.

A pair of electrodes 34 are vapor-deposited on a lead titanate piezoelectric ceramic element 33, one end of one electrode 34 being bonded and electrically connected to a metal plate 36 via an adhesive layer 35. Protruding from the electrodes 34 are leads 37 for conducting signals, the leads being electrically insulated from each other. For protection from the effects of ambient humidity, resin coating 38 is applied to seal the piezoelectric ceramic element 33, the electrodes 34, the metal surface 36, the base portions of the leads 37, etc., in a moisture-proof integral molding, thus constructing the pyroelectric vapor sensor 4.

The underside of the metal plate 36 in FIG. 10*b* is hereinafter referred to as the metal side, and the upper side on which the piezoelectric ceramic element 33 and the resin coating 38 are mounted as the component side. Also, the piezoelectric ceramic element 33 and the electrodes 34 are collectively referred to as the pyroelectric element.

Figure 11:
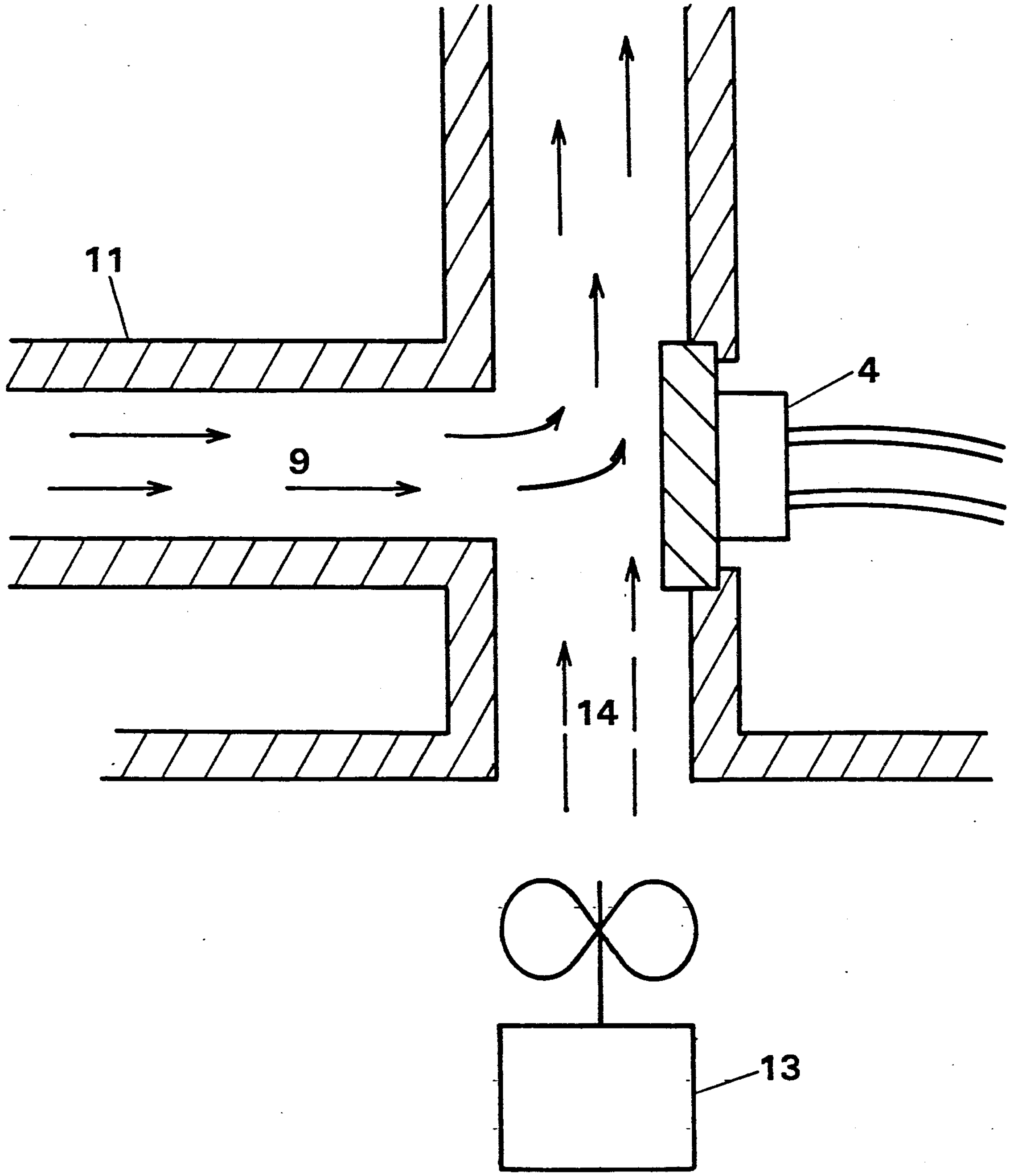
FIG. 11 is a cross sectional view showing a part of an air duct for a cooking apparatus with a pyroelectric vapor sensor of this invention.

FIG. 11 is a cross sectional view showing the major construction of an air duct for a cooking apparatus with a pyroelectric vapor sensor of the present invention. The small fraction 9 of vapor passes through the air duct 11 and strikes the pyroelectric vapor sensor 4 to apply heat thereto. The cooling air 14 from the cooling fan 13 is fed into the air duct 11 to cool the metal side of the pyroelectric vapor sensor 4 to prevent the temperature of the pyroelectric vapor sensor 4 from rising due to the small fraction 9 of the vapor.

Figure 12:
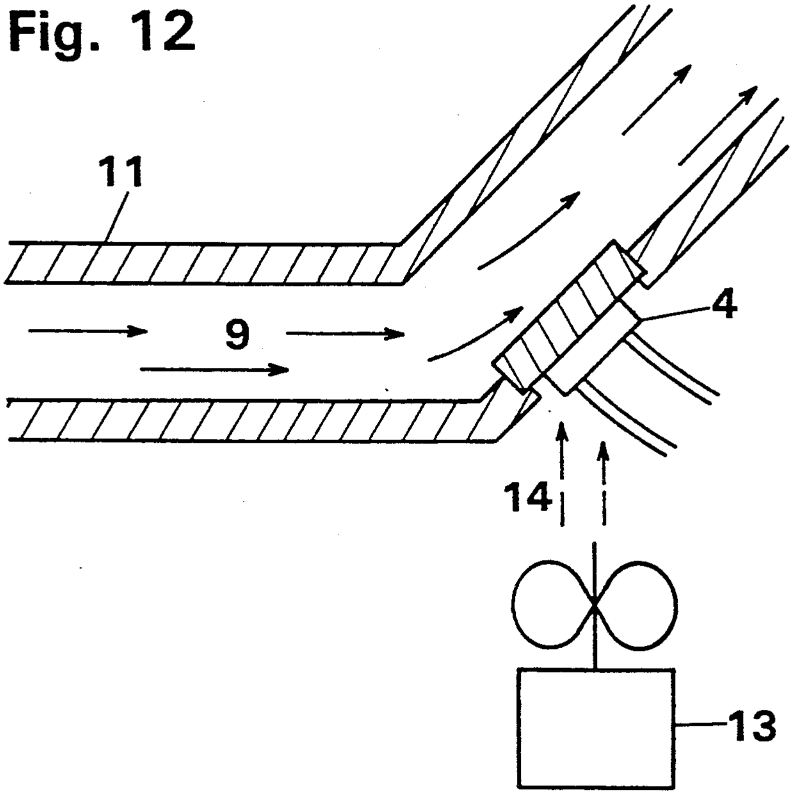
FIG. 12 is a cross sectional view showing a part of another duct for a cooking apparatus with a pyroelectric vapor sensor of this invention.

FIG. 12 is a cross sectional view showing the major construction of an air duct for a cooking apparatus with a pyroelectric vapor sensor of the present invention. A small fraction 9 of vapor passes through the air duct 11 and strikes the pyroelectric vapor sensor 4 to apply heat thereto. The cooling air 14 from the cooling fan 13 is fed into the air duct 11 to cool the component side of the pyroelectric vapor sensor 4 to prevent the temperature of the pyroelectric vapor sensor 4 from rising due to the small fraction 9 of the vapor.

Figure 13:
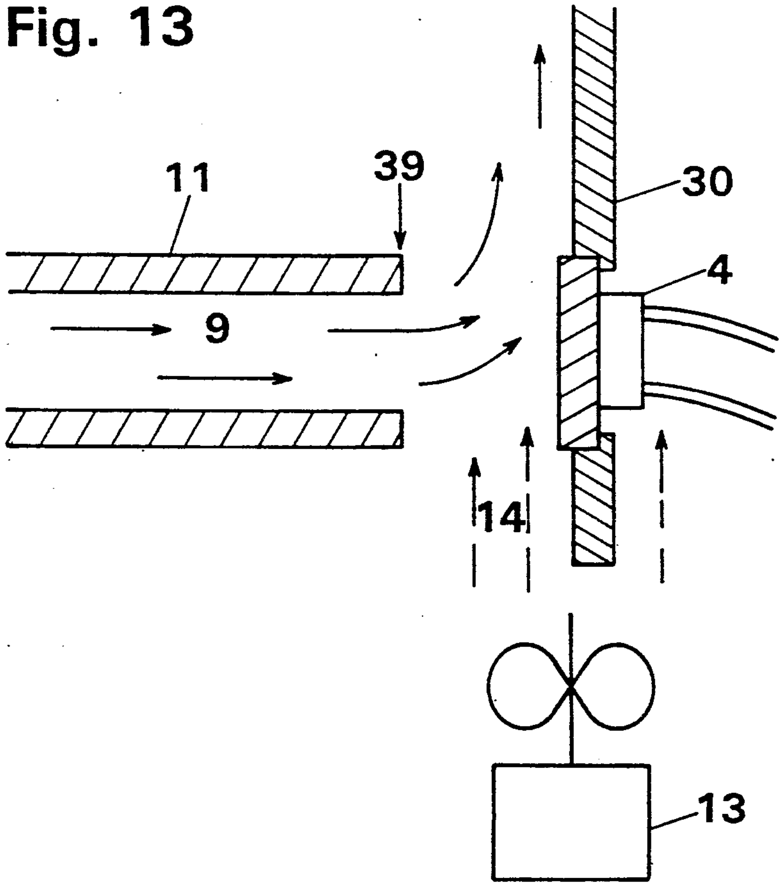
FIG. 13 is a cross sectional view showing a part of another duct for a cooking apparatus with a pyroelectric vapor sensor of this invention.

FIG. 13 is a cross sectional view showing the major construction of an air duct for a cooking apparatus with a pyroelectric vapor sensor of the present invention. The small fraction 9 of vapor passes through the air duct 11 and strikes the pyroelectric vapor sensor 4 to apply heat thereto. The cooling air 14 from the cooling fan 13 is fed to cool both the metal and component sides of the pyroelectric vapor sensor 4 to prevent the temperature of the pyroelectric vapor sensor 4 from rising due to the small fraction 9 of the vapor. The pyroelectric vapor sensor 4 is mounted with a mounting bracket 30 at a position away from an open end 39 of the air duct 11.

Figure 14:
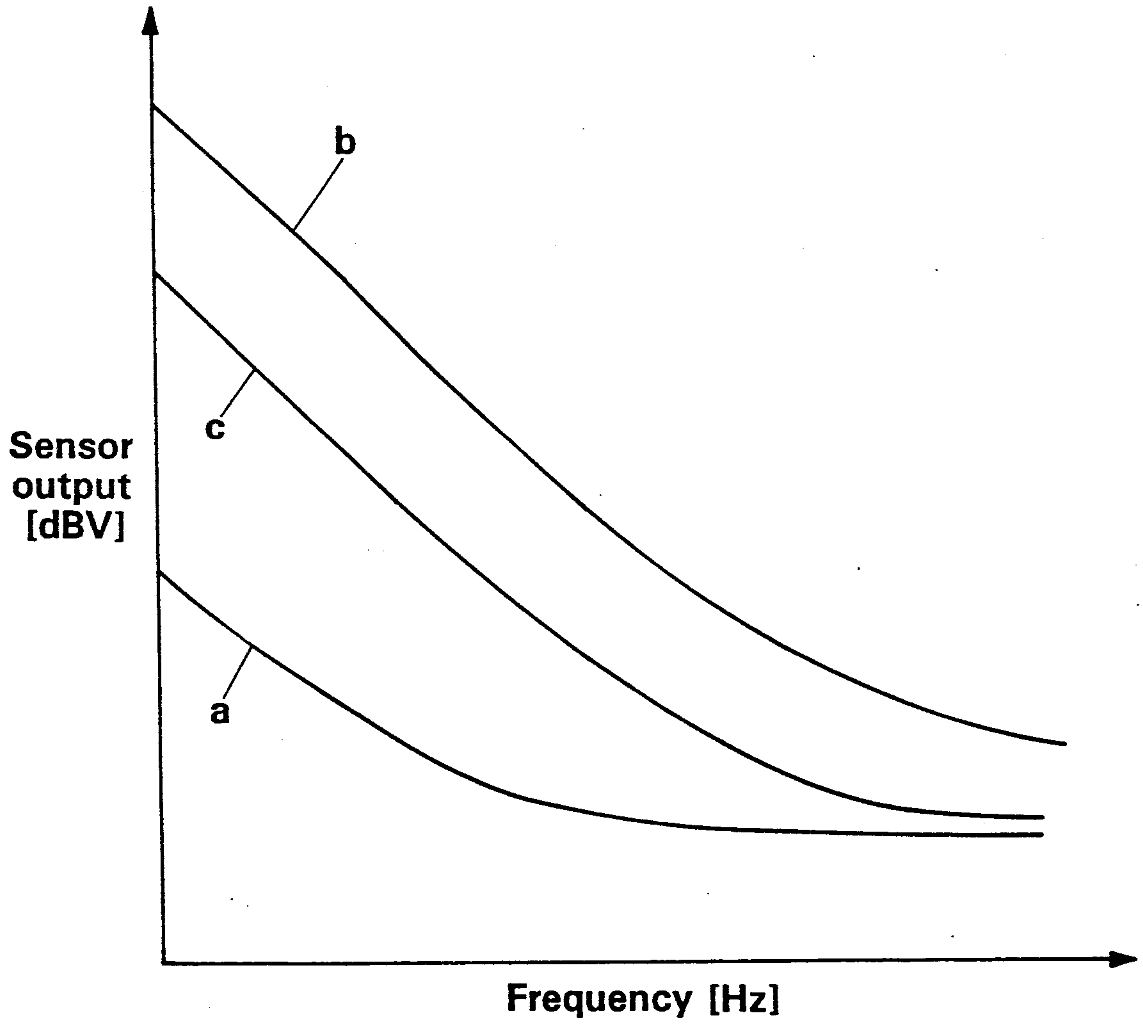
FIG. 14 is a frequency characteristic chart of the pyroelectric vapor sensor output.

FIG. 14 is a frequency characteristic chart of the pyroelectric vapor sensor output. An output b is obtained after boiling of food as against an output a before boiling, the difference between a and b being used for detection of the boiling. However, with the previously noted conventional construction, when dew is formed on the pyroelectric vapor sensor surface or when the sensor temperature rises as a result of repeated cooking, no more than an output c can be generated. In other words, the output drops from b to c. Therefore, the conventional construction has had the problem that the detection is delayed or no detection is made even when the food has come to a boil. On the other hand, with the construction of the present invention, even if cooking is repeated, dew will not be formed on the pyroelectric vapor sensor surface and the sensor temperature will be kept at a stable level, thus consistently generating the output b in FIG. 14 for cooking of food of the same amount and the same kind and thereby providing stable cooking results with a consistent detection time.

Figure 15:
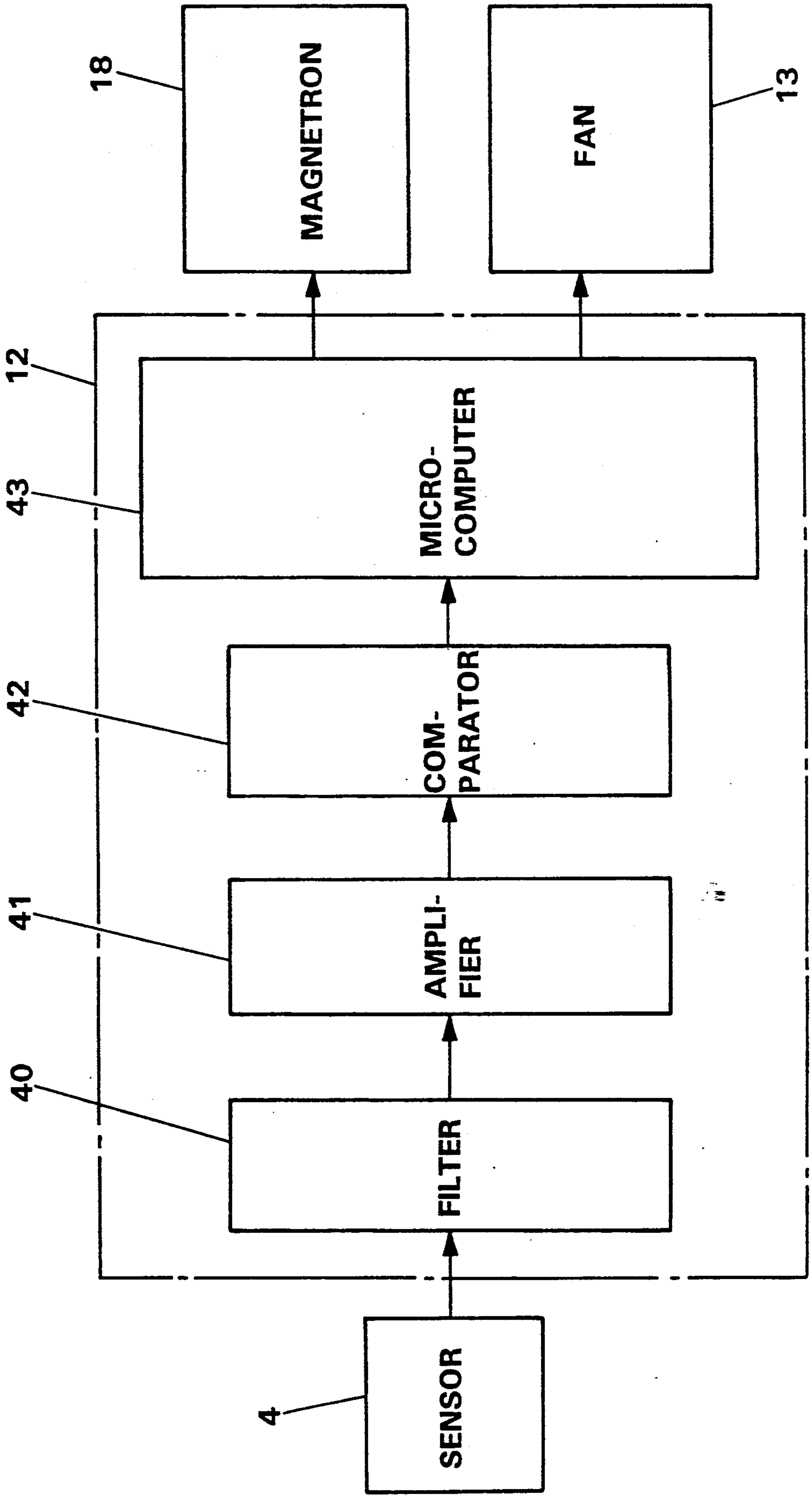
FIG. 15 is a block diagram showing a control unit of the cooking apparatus of this invention.

FIG. 15 is a block diagram showing a control unit of the cooking apparatus of the present invention. The output from the pyroelectric vapor sensor 4 is fed to the control unit 12 to control the operations of the electromagnetic wave generator 18, the cooling fan 13 and other units. The control unit 12 comprises a filter 40 which transmits frequencies in the pass band, an amplifier 41 which amplifies the output to the workable level for control, a comparator 42 which compares the output with its set value, and a microcomputer 43 which generates control signals. In the operation of the control unit 12, if the food has not come to a boil yet, the output level remains lower than the set value of the comparator 42, therefore, the input to the microcomputer 43 remains unchanged, keeping the units in operation. When the food comes to a boil, the output level increases beyond the set value of the comparator 42, causing the input to the microcomputer 43 to be inverted to generate control signals for stopping the operations of the units.

Figure 16:
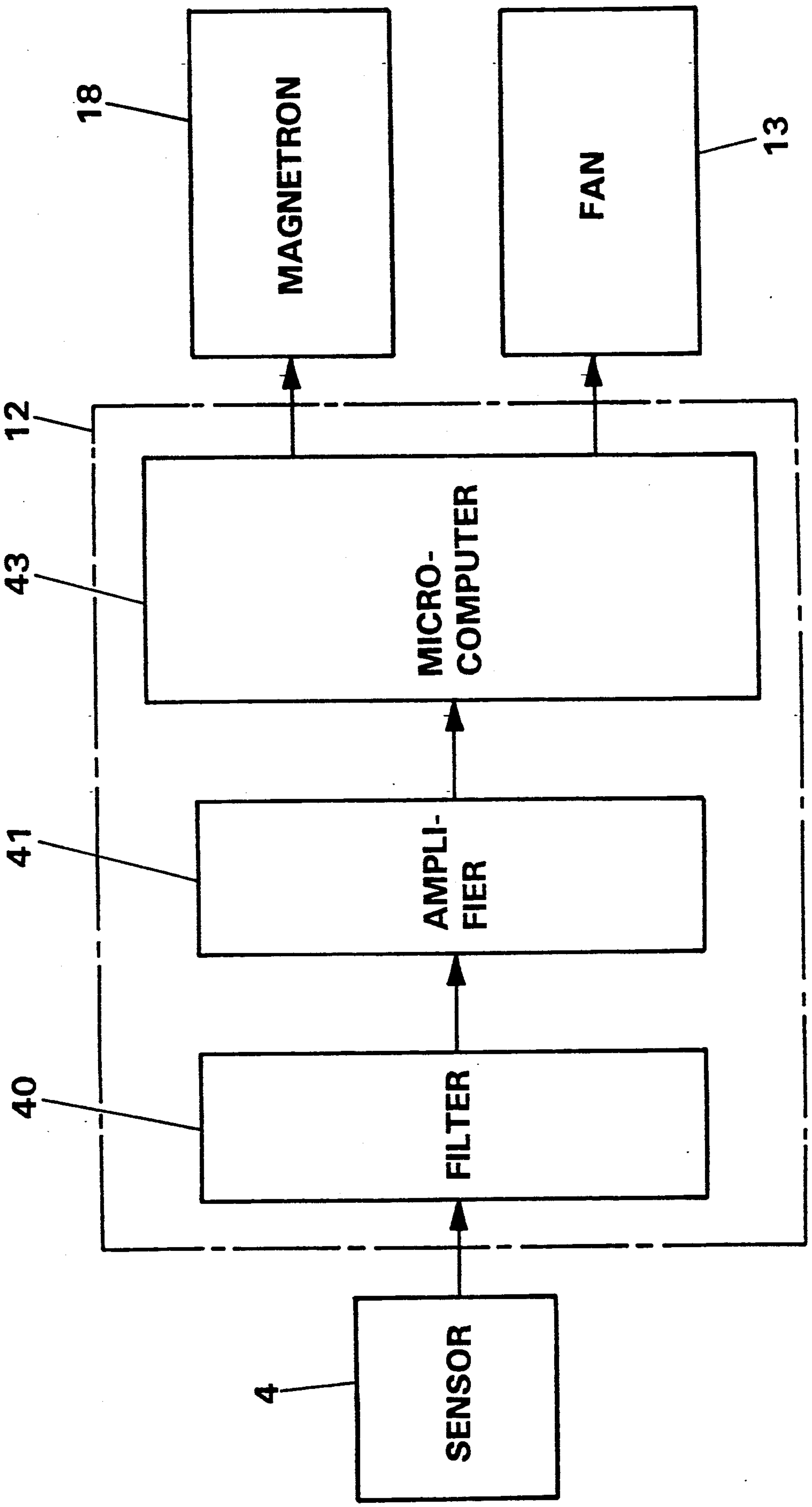
FIG. 16 is a block diagram showing another control unit of the cooking apparatus of this invention.

FIG. 16 is a block diagram showing another control unit of the cooking apparatus of the present invention. The control unit in this example has the same construction as that shown in FIG. 15, except that the comparator 42 is omitted. In this example, the output from the amplifier 41 is analog-digital converted to be input to the microcomputer 43, and the microcomputer 43 generates control signals according to the analog-digital converted input signals.

Thus, the present invention can attain the following excellent effects:

(1) The cooking apparatus is so constructed that the vapor is led to the pyroelectric vapor sensor through an air duct made from a pipe or the like. Such construction allows a wider selection of installation positions for the pyroelectric vapor sensor and permits the selection of a low temperature position in the cooking apparatus for the installation of the pyroelectric vapor sensor, thus making it possible to detect the heating condition of food with the pyroelectric vapor sensor kept at a relatively stable temperature and therefore to provide consistent cooking results.

(2) Since the cooking apparatus is provided with a cooling fan for cooling the pyroelectric vapor sensor, it is easy to prevent the temperature rise of the pyroelectric vapor sensor, thus making it possible to detect the heating condition of food with the pyroelectric vapor sensor kept at an extremely stable temperature condition regardless of the installation position thereof and therefore to provide consistent cooking results.

(3) The high-frequency heating apparatus is so constructed that the electromagnetic wave generator is used as a heat source and the cooling fan cools both the pyroelectric vapor sensor and the electromagnetic wave generator. Such construction eliminates the need for a cooling fan exclusively for the pyroelectric vapor sensor and permits prevention of the temperature rise of the pyroelectric vapor sensor using a very simple construction, thus making it possible to detect the heating condition of food with the pyroelectric vapor sensor kept at an extremely stable temperature condition and therefore to provide consistent cooking results.

(4) The cooking apparatus is so constructed that the cooling fan cools the metal side of the pyroelectric vapor sensor, which provides the advantage that dew does not easily form on the metal surface of the pyroelectric vapor sensor, thus preventing malfunction due to dew condensation while enhancing the sensor sensitivity per unit of hot vapor. Enhancement of the sensor sensitivity is achieved by mixing the hot vapor with cool air and thus providing fluctuation in the temperature (hot air and cool air temperatures) of the mixed air that strikes the metal surface of the pyroelectric vapor sensor, the temperature fluctuation causing the $\Delta T$ to change constantly.

(5) The cooking apparatus is so constructed that the cooling fan cools the component side of the pyroelectric vapor sensor to directly suppress temperature rise of the piezoelectric ceramic element, thus making it possible to detect the heating condition of food with the pyroelectric vapor sensor kept at a stable temperature condition and therefore to provide consistent cooking results.

(6) The cooking apparatus is so constructed that the pyroelectric vapor sensor is installed at a distance from the open end of the air duct. Such construction allows a simple construction of the air duct, facilitates mixing with the cool air, and makes it possible to cool both sides of the pyroelectric vapor sensor. Therefore, dew does not easily form on the metal surface, the sensitivity is enhanced, and it is easy to keep the pyroelectric vapor sensor at a low temperature, thus making it possible to detect the heating condition of food under a stable condition and therefore to provide consistent cooking results.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A cooking apparatus comprising a heating compartment for accommodating food to be cooked, an electromagnetic wave generator for heating the food in the heating compartment, a pyroelectric vapor sensor for detecting a cooking condition of the food, the pyroelectric vapor sensor including a pyroelectric element and a metal plate for supporting the pyroelectric element, a vapor vent provided in the heating compartment, an air conduit extending between the vapor vent and the pyroelectric vapor sensor such that a vapor discharged from the cooking food in the heating compartment flows from the heating compartment through the vapor vent and air conduit to the pyroelectric vapor sensor, a cooling fan for providing a flow of cool air to both cool the electromagnetic wave generator and to mix with the vapor discharged from the heating compartment, the pyroelectric vapor sensor being positioned outside the heating compartment at a position such that cool air from outside the heating compartment and the mixture of vapor and cool air from the cooling fan mixes proximate the pyroelectric vapor sensor to thereby cool the pyroelectric element and thereby maintain the pyroelectric vapor sensor at a relatively stable temperature.

2. The cooking apparatus according to claim 1 wherein the metal plate of the pyroelectric vapor sensor is also cooled by the cooling fan.

3. The cooling apparatus according to claim 1, wherein the pyroelectric vapor sensor is located at a position apart from an opening of the air conduit.

* * * * *